July 24, 1956

H. B. BARRETT 2,755,881

SILENCER BANDS FOR DEADENING THE SOUND OF THE
CUTTING TOOL IN BRAKE DRUM TURNING LATHES

Filed Nov. 10, 1952

INVENTOR.
HARRY B. BARRETT
BY
Alfred W. Fishoff
ATTORNEY

United States Patent Office 2,755,881
Patented July 24, 1956

2,755,881

SILENCER BANDS FOR DEADENING THE SOUND OF THE CUTTING TOOL IN BRAKE DRUM TURNING LATHES

Harry B. Barrett, St. Louis, Mo.

Application November 10, 1952, Serial No. 319,755

2 Claims. (Cl. 181—33)

This invention relates in general to certain new and useful improvements in accessory equipment for use in conjunction with turning lathes and, more particularly, to a silencer band for deadening the sound of the cutting tool in a brake drum turning lathe.

In the repair of automotive brakes, it frequently becomes necessary to re-surface the interior or contact face of the brake drum which has become scored and out-of-round due to excessive wear or improper use. There are various types of so-called brake drum lathes for performing this operation and this type of tool usually consists of some means for mounting the brake drum upon a suitable arbor or holding device so that it may be surfaced by a fly cutter or similar cutting tool which rotates around around the center of the arbor or mounting device. Some types of brake drum lathes employ a stationary cutting tool and rotate the brake drum. In either case, the noise of the turning operation is extremely loud and penetrating because the brake drum has a very large exposed surface which acts as a resonator and, in effect, amplifies the cutting noises. Furthermore, the type of cutting tool required for this purpose must be extremely hard and is frequently carbide-tipped. As a result, the noise of the cutting operation frequently is similar to a high pitched screech which is extremely annoying to workmen doing other tasks in the immediate vicinity.

It is, therefore, the primary object of the present invention to provide a noise deadening or silencing device which can be utilized in conjunction with demounted brake drums when the latter are being turned in a brake drum lathe and which will materially suppress and eliminate the noises of the lathe tool as it performs its cutting operation.

It is a further object of the present invention to provide a silencer band of the type stated which may be simply and quickly applied to the brake drum and will readily lend itself to use with brake drums of various different sizes.

It is also an object of the present invention to provide a silencer band of the type and for the purpose stated which is uniquely constructed for accommodating itself to, and snugly fitting down upon, brake drums of various different external surface contours and particularly brake drums having an upstanding peripheral ridge or bead.

With the above and other objects in view, my invention resides in the novel features of form, construction, arrangement, and combination of parts presently described and pointed out in the claims.

In the accompanying drawing—

Figure 2:
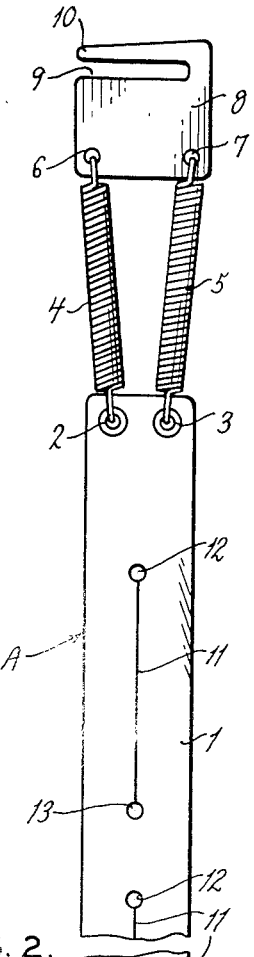
Figure 2 is a top plan view, partly broken away, of a silencer band constructed in accordance with and embodying the present invention.

Referring now in more detail and by reference characters to the drawing, which illustrates a preferred embodiment of the present invention, A designates a brake drum silencer band comprising an elongated belt-like strap 1 formed of heavy rubber of a resilient, flexible, but nevertheless relatively dense, consistency of the type commonly found in rubber belting. At one end, the strap 1 is provided with a pair of eyelets 2, 3, for respectively receiving the hooked ends of matched tensioning springs 4, 5, which are, in turn, engaged at their other ends in apertures 6, 7, of a flat metallic hook-plate 8 provided transversely across its outer end with a slot 9 extending inwardly from one lateral margin thereof and, in effect, forming an elongated transversely extending tongue 10, all as best seen in Figure 2 and for purposes presently more fully appearing.

At uniformly spaced intervals throughout its length, the strap 1 is provided with a plurality of short centrally disposed longitudinally extending slits 11, each terminating at its opposite ends in somewhat enlarged circular apertures 12, 13. The slits 11 are formed with a very sharp tool so as to be, in effect, razor-cuts.

Figure 1:
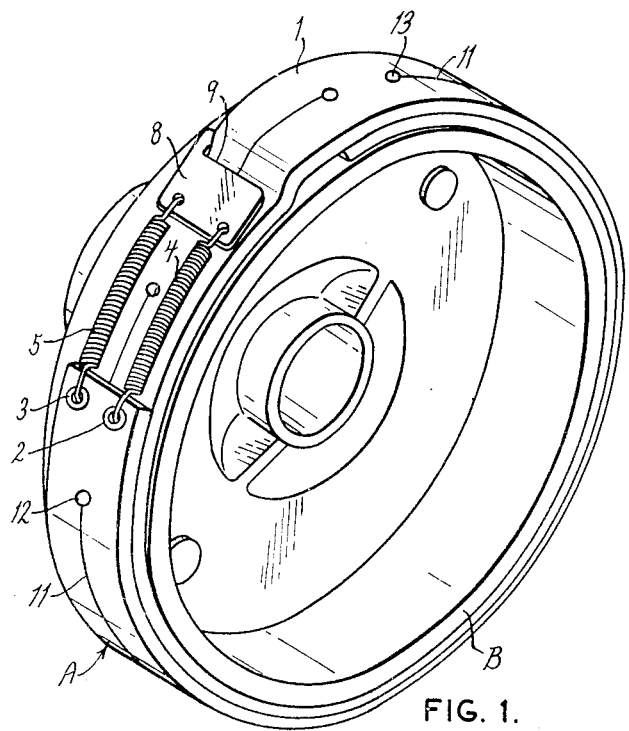
Figure 1 is a perspective view of an automotive brake drum fitted with a silencer band constructed in accordance with and embodying the present invention.

In use, the silencer band A is wrapped around the outer face of a brake drum, such as the brake drum illustrated for illustrative purposes at B in Figure 1. In wrapping the silencer band A around the brake drum, care must be observed to draw it up tightly around the entire circumference and, thereupon, maximum tension is placed upon the springs 4, 5, stretching them as much as possible. The hook-plate 8 is thereupon deflected downwardly and the tongue 10 inserted under the top layer of the strap 1, holding the entire assembly securely in place substantially as shown in Figure 1.

Figure 3:
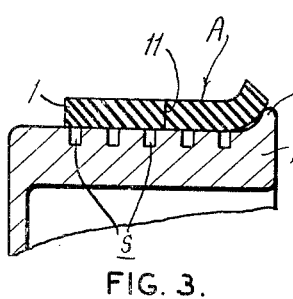
Figure 3 is a fragmentary transverse sectional view showing the silencer band as it is applied to one type of automotive brake drum.
Figure 4:
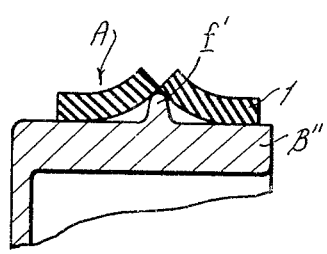
Figure 4 is a similar fragmentary transverse sectional view showing the silencer band applied to a different type of automotive brake drum.

If the brake drum B has a flat, uncontoured outer or peripheral face, the silencer band will lie tight and flat across the entire face thereof and will effectively deaden all noise from the cutting tool and other drum-turning operations which may be performed on the brake drum B. If a brake drum B', such as that shown in Figure 3, is being turned, that is to say a brake drum having an outer peripheral flange f and a series of peripheral slots s, the silencer band A will fit therearound substantially as shown in Figure 3. Similarly, if a brake drum B'', of the type shown in Figure 4, that is to say a brake drum having an upstanding medial peripheral flange f', the silencer band A will fit snugly therearound substantially as shown in Figure 4 and the slits 11 will open up at spaced intervals so that the main portions of the silencer band A will rest upon the peripheral faces of the brake drum B''. From this it will be evident that the silencer band A is substantially universal in its applicability to all different types of brake drums and will readily adapt itself to a snug-fitting, sound-deadening contact therewith.

It should be understood that changes and modifications in the form, construction, arrangement, and combination of the several parts of the silencer band for deadening the sound of the cutting tool in brake drum turning lathes may be made and substituted for those herein shown and described without departing from the nature and principle of my invention.

Having thus described my invention, what I claim and desire to secure by Letters Patent is:

1. A silencer band for use in conjunction with brake drums and similar drum-like metallic objects to suppress noise when the interior faces thereof are being surfaced in a turning lathe; said silencer band comprising an elongated strap provided at one end with a pair of lengthwise extending parallel springs which are in turn swingably provided at their ends with a hook-like elements, said strap further being provided intermediate its ends with a series of longitudinally extending endwise spaced slits.

2. A silencer band for use in conjunction with brake drums and similar drum-like metallic objects to suppress noise when the interior faces thereof are being surfaced in a turning lathe; said silencer band comprising an elongated limber belt-like strap having a length substantially greater than the largest circumferential size of the brake drums and drum-like metallic objects with which it is to be used so as to be capable of being manually wrapped therearound and over upon itself, said strap being provided at uniformly spaced intervals with a plurality of slits, the opposing faces of which are substantially contiguous when the strap is in flat unstressed position, said strap further being provided at one end with a pair of relatively long flexible tension springs which, in turn, are engaged at their outer ends with a loose-fitting swingable hook having a laterally opening hook-forming slot so that the hook may be swung laterally without disturbing the overlying relationship of the strap and a portion of the hook may be slipped sidewise underneath a portion of the strap when it is doubled around the metallic object in conjunction with which it is used, thereby tensioning and retaining the silencer band in operative position for use.

References Cited in the file of this patent

UNITED STATES PATENTS

| | | |
|---|---|---|
| 369,023 | Newell | Aug. 30, 1887 |
| 627,810 | Rowbotham | June 27, 1899 |
| 650,290 | Wirt | May 22, 1900 |
| 1,563,368 | Hutchinson | Dec. 1, 1925 |
| 1,791,495 | Frey | Feb. 10, 1931 |
| 1,877,677 | Manaster | Sept. 13, 1932 |
| 2,012,838 | Tiloen | Aug. 27, 1935 |
| 2,252,804 | Gass | Aug. 19, 1941 |